US006999588B1

(12) United States Patent
Oishi

(10) Patent No.: US 6,999,588 B1
(45) Date of Patent: Feb. 14, 2006

(54) IMAGE INPUT APPARATUS, IMAGE INPUT METHOD, RECORDING MEDIUM, AND ENCRYPTION PROCESSING PROGRAM STORED IN COMPUTER-READABLE MEDIUM

(75) Inventor: Kazuomi Oishi, Goleta, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/222,846

(22) Filed: Dec. 30, 1998

(30) Foreign Application Priority Data

Jan. 9, 1998 (JP) .................................. 10-003367

(51) Int. Cl.
*H04N 1/44* (2006.01)

(52) U.S. Cl. ...................... 380/246; 380/243; 380/259; 380/284; 713/171; 713/172; 705/57

(58) Field of Classification Search ................ 380/243, 380/284, 285, 246, 259; 713/172, 171; 705/57
See application file for complete search history.

(56) References Cited

U.S. PATENT DOCUMENTS

| | | | | |
|---|---|---|---|---|
| 4,605,820 A | * | 8/1986 | Campbell, Jr. ............... 380/277 |
| 5,131,040 A | * | 7/1992 | Knapczyk ..................... 380/50 |
| 5,253,293 A | * | 10/1993 | Shigemitsu et al. ........... 380/9 |
| 5,392,351 A | | 2/1995 | Hasebe et al. ................. 380/4 |
| 5,398,283 A | * | 3/1995 | Virga ........................... 380/18 |
| 5,535,277 A | * | 7/1996 | Shibata et al. ................. 380/28 |
| 5,606,613 A | | 2/1997 | Lee et al. ...................... 380/21 |
| 5,619,025 A | * | 4/1997 | Hickman et al. ............ 235/454 |
| 5,633,932 A | | 5/1997 | Davis et al. ................... 380/25 |
| 5,720,012 A | | 2/1998 | McVeigh et al. ............ 395/113 |
| 5,752,697 A | | 5/1998 | Mandel et al. ............... 271/288 |
| 5,870,468 A | * | 2/1999 | Harrison ...................... 713/165 |
| 5,903,646 A | | 5/1999 | Rackman ....................... 380/4 |
| 5,933,498 A | | 8/1999 | Schneck et al. ............... 380/4 |
| 5,933,499 A | * | 8/1999 | Enari ........................... 380/217 |
| 5,933,501 A | | 8/1999 | Leppek ........................ 380/21 |
| 5,949,881 A | | 9/1999 | Davis .......................... 380/25 |

OTHER PUBLICATIONS

Schneier, Bruce, Applied Cryptography 1996, John Wiley & Sons, Inc., 2nd ed., p. 48.*
Schneier, Bruce, Applied Cryptography 1997, John Wiley & Sons, Inc., 2nd ed., pp. 51, 176, and 184.*
Journal of Cryptology; C.P. Schnorr; "Efficient Signature Generation by Smart Cards"; 1991, vol. 4, pp. 161-174.
Advances in Cryptology—Crypto '86; A. Fiat et al; "How to Prove Yourself: Practical Solutions to Identification and Signature Problems"; pp. 186-194.

(Continued)

*Primary Examiner*—Emmanuel L. Moise
*Assistant Examiner*—Paul E. Callahan
(74) *Attorney, Agent, or Firm*—Fitzpatrick, Cella, Harper & Scinto

(57) ABSTRACT

In an image input apparatus provided with an image pick-up unit, an image signal generated by the image pick-up unit is converted into digital information. The digital information is then encrypted by using an encryption key. The encryption key is input into the image input apparatus from an external apparatus, such as an IC card. The image input apparatus erases the encryption key after the digital information has been encrypted. With this arrangement, unauthorized users can be prevented from obtaining the encryption key, and different encryption keys can be assigned to a plurality of users. Thus, the privacy and the security of the image information can be enhanced, and the copyright of the image information can be protected more reliably.

20 Claims, 5 Drawing Sheets

OTHER PUBLICATIONS

IEEE Transactions on Information Theory; T. Elgamal; "A Public Key Cryptosystem and a Signature Scheme Based on Discrete Logarithms"; vol. IT-31, No. 4, Jul. 1985, pp. 469-472.

R.L. Rivest, A. Schami and L. Adleman, "A Method Of Obtaining Digital Signatures And Public Key Cryptosystems", Communications of the ACM, Feb. 1978, vol. 21, No. 2, pp. 120-126.

Dannenberg, Roger B., et al., "A Butler Process for Resource Sharing on Spice Machines", ACM Transactions on Office Information Systems, vol. 3, No. 3, pp. 234-252, Jul. 1985.

* cited by examiner

IMAGE INPUT APPARATUS, IMAGE INPUT METHOD, RECORDING MEDIUM, AND ENCRYPTION PROCESSING PROGRAM STORED IN COMPUTER-READABLE MEDIUM

BACKGROUND OF THE INVENTION

1. Field of the Invention

The present invention generally relates to an image input apparatus, an image input method, a recording medium, and an encryption processing program stored in a computer-readable medium. More particularly, the invention relates to a technique for protecting the copyright for image signals.

2. Description of the Related Art

In image input apparatuses, such as still cameras, video cameras, and scanners, all of which are of the analog type, analog image signals, such as motion pictures or still images, obtained by photographing subjects, are converted into recordable/reproducible signals, which are then output to an external source. Alternatively, such analog image signals are recorded on a recording medium by using a recording apparatus.

Generally, since the data in the above-described recording medium can be stored over a long period, it is suitable to observe or reuse the stored analog image information later. Accordingly, in response to the user's demand, a reproducing apparatus reads analog image information recorded on the recording medium and reconstitutes it to an image that can be viewed by humans. The image is then reproduced through an output apparatus, such as a printer or a display unit.

Because of recent progress in digital technology, analog-type image input apparatuses are gradually being replaced by digital-type image input apparatuses. In most cases, the digital-type image input apparatuses optically read a subject to be photographed and photoelectrically convert the image into an electric signal, which is then converted into a digital signal. Subsequently, the image input apparatuses perform predetermined image processing on the digital image. The resulting image information is then output to an external source as digital information of a predetermined data format.

The above predetermined data formats include coding systems for performing high-efficiency coding on image information, such as MH, MR, MMR, TIFF, JPEG, and MPEG.

A reproducing apparatus decodes the coded digital information by using decoding algorithms corresponding to the coding system used in the image input apparatus. The decoded information is then reproduced as the original image that can be viewed by humans through an output apparatus, such as a printer or a display unit.

The digital image information coded in the above-described predetermined data format will be simply referred to as "coded image information" hereinafter. It is, in general, very easy to incorporate the coded image information into an image processing apparatus, for example, a personal computer, and to edit the image information by using image information editing software.

According to the digital system, when the coded image information or the edited image information is copied, the image quality of the copied information is exactly the same as that of the original information. In contrast, the image quality of analog information is always degraded when copied. In view of maintaining image quality, the digital system is a significant improvement over the analog system.

In the analog system, however, the image quality of analog information is invariably degraded when copied. Accordingly, illegal copying does not present a serious practical problem.

On the other hand, in the digital system, it is possible to produce unlimited numbers of copies which are identical to the original. Accordingly, anyone is able to freely copy the original, i.e., consumers are able to copy a product, such as a movie, without paying a royalty for the copied movie to the copyright holder, which inevitably becomes a major problem for copyright holders.

Alternatively, if the original of the coded image information is recorded on a computer, the following may occur. A cracker may illegally access the computer and copy the image information, which may be then sold at a cost lower than the legitimate product, or it may be reedited and sold as another product.

As an effective countermeasure against the aforementioned copying of digital information, an encrypting technique may be used. To "encrypt" is to convert the original information into a coded form that is not understood by anyone other than authorized users.

Generally, an encryption operation is performed by information processing apparatuses, such as computers. More specifically, the original image produced by an image input apparatus is temporarily stored in an information processing apparatus and is then encrypted. A decryption key for decoding the encrypted image is safely stored within the information processing apparatus.

Thus, even if the encrypted image information recorded on the image processing apparatus is illegally copied, the illegal user is unable to read the content of the encrypted image information unless the decryption key is obtained. That is, by encrypting the original image in the information processing apparatus, the copyright of the image information can be safely protected.

As noted above, however, the original image produced in the image input apparatus is first output to the information processing apparatus and is then encrypted. If the image information is accessed during the period from which the image information is output from the image input apparatus to which it is encrypted in the information processing apparatus, such as a computer, there may be the danger of illegally copying the image information, thereby jeopardizing the security of the image information.

Additionally, a decryption key for decoding the encrypted image information, which is safely stored in the image information processing apparatus, may be illegally obtained by the users other than authorized users by using a new method of attack.

SUMMARY OF THE INVENTION

Accordingly, it is an object of the present invention to solve the above-described problems.

It is another object of the present invention to provide an image input apparatus in which the privacy and the security of image information are enhanced and the copyright of the image information is protected more reliably by assigning different encryption keys to a plurality of users without increasing the complexity of an encryption unit.

It is still another object of the present invention to provide an image input method in which the privacy and the security of image information are enhanced and the copyright of the image information is protected more reliably by assigning different encryption keys to a plurality of users without increasing the complexity of encryption processing.

It is a further object of the present invention to provide a recording medium in which the privacy and the security of image information are enhanced and the copyright of the image information is protected more reliably by assigning different encryption keys to a plurality of users.

It is a further object of the present invention to provide an encryption processing program stored in a computer-readable medium, in which the privacy and the security of image information are enhanced and the copyright of the image information is protected more reliably by assigning different encryption keys to a plurality of users without increasing the complexity of encryption processing.

To achieve the above objects, according to one aspect of the present invention, there is provided an image input apparatus including conversion means for converting an image signal into digital information. Encryption means encrypts the digital information by using a first encryption key. Erasing means erases the first encryption key after the digital information has been encrypted.

According to another aspect of the present invention, there is provided an image input apparatus including conversion means for converting an image signal into digital information. Input means inputs an encryption key from an external source. Encryption means encrypts the digital information by using the encryption key.

According to still another aspect of the present invention, there is provided an image input apparatus including conversion means for converting an image signal into digital information. Information encrypting means encrypts the digital information by using an internal encryption key disposed within the image input apparatus. Input means inputs from an external source an external encryption key for encrypting the internal encryption key. Key encrypting means encrypts the internal encryption key by using the external encryption key.

According to a further aspect of the present invention, there is provided an image input method including the steps of: converting an image signal into digital information; encrypting the digital information by using an encryption key; and erasing the encryption key after the digital information has been encrypted.

According to a yet further aspect of the present invention, there is provided an image input method including the steps of: converting an image signal into digital information; inputting an encryption key from an external source; and encrypting the digital information by using the encryption key.

According to a further aspect of the present invention, there is provided an image input method including the steps of: converting an image signal into digital information; encrypting the digital information by using an internal encryption key disposed within the image input apparatus; obtaining from an external source an external encryption key for encrypting the internal encryption key; and encrypting the internal encryption key by using the external encryption key.

According to a further aspect of the present invention, there is provided a recording medium attachable to and detachable from an image processing apparatus for encrypting a digital image signal. The recording medium includes means for supplying to the image processing apparatus an encryption key required for encrypting the digital image signal. Recording means records a decryption key corresponding to the encryption key.

According to a further aspect of the present invention, there is provided a recording medium attachable to and detachable from an image processing apparatus for encrypting a digital image signal by using a first encryption key and for encrypting the first encryption key by using a second encryption key. The recording medium includes means for supplying the second encryption key to the image processing apparatus. Recording means records a decryption key corresponding to the first encryption key.

According to a further aspect of the present invention, there is provided an encryption processing program stored in a computer-readable medium. The encryption processing program includes: a step of converting an image signal into digital information; a step of encrypting the digital information by using an encryption key; and a step of erasing the encryption key after the digital information has been encrypted.

According to a further aspect of the present invention, there is provided an encryption processing program stored in a computer-readable medium. The encryption processing program includes: a step of converting an image signal into digital information; a step of encrypting the digital information by using an internal encryption key disposed within the image input apparatus; a step of obtaining from an external source an external encryption key for encrypting the internal encryption key; and a step of encrypting the internal encryption key by using the external encryption key.

Still other objects of the present invention, and the advantages thereof, will become fully apparent from the following detailed description of the embodiments.

DESCRIPTION OF THE PREFERRED EMBODIMENTS

Figure 1:
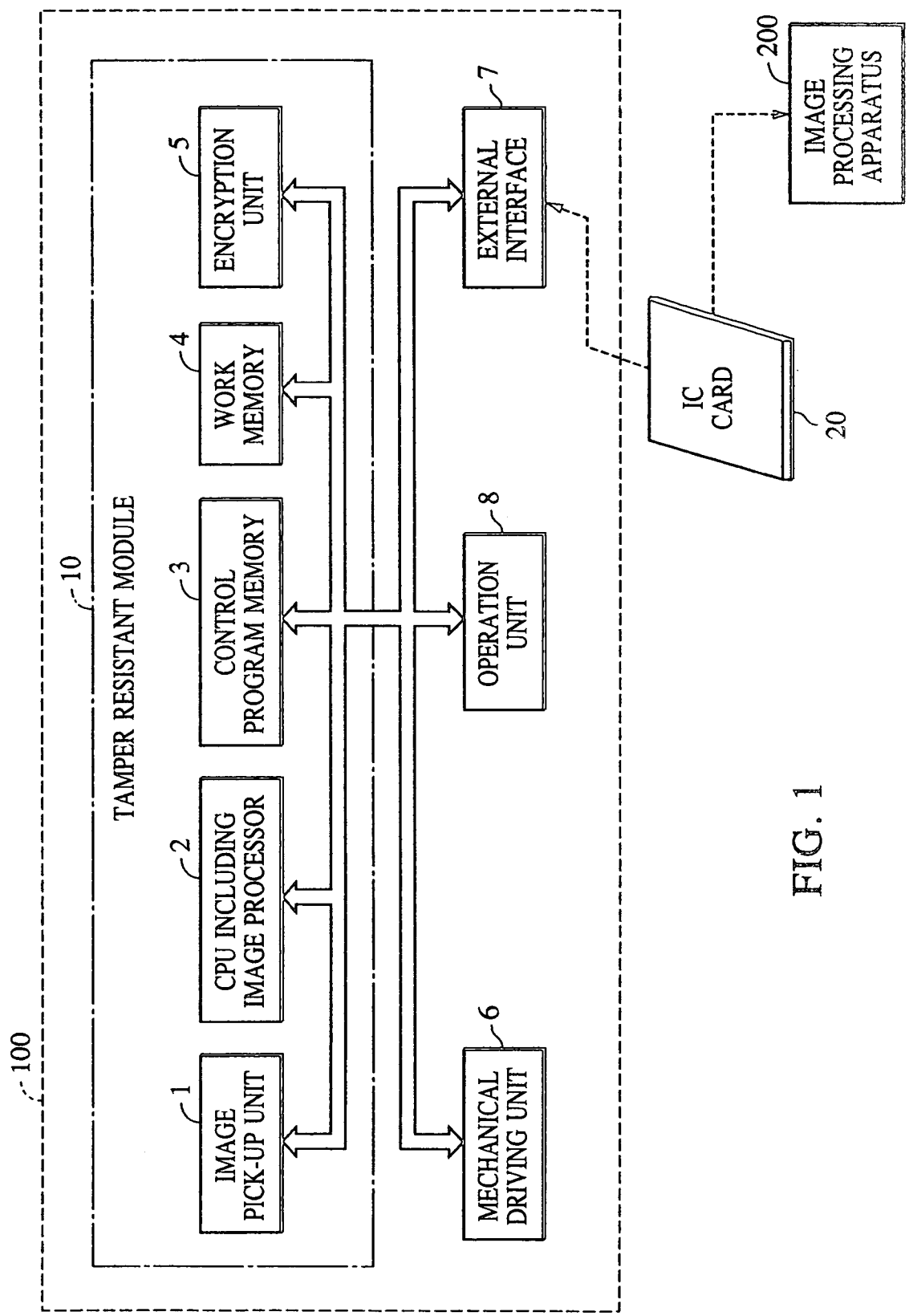
FIG. 1 is a block diagram illustrating the configuration of an image input apparatus according to a first embodiment of the present invention.

The preferred embodiments of the present invention will now be described in detail hereinafter with reference to the accompanying drawings.

1. Encryption Technique

In encryption processing, original data is referred to as "plaintext". To convert the plaintext into a ciphertext that is meaningless to unauthorized users is referred to as "encryption", and the conversion procedures for an encryption operation are referred to as "encryption algorithms". The plaintext includes not only text data, but also all types of information data, such as sound data and image data.

"Encryption" is a conversion using a parameter, such as an encryption key. To obtain the plaintext from the ciphertext by an authorized user is referred to as "decrypting", which is performed by using a parameter corresponding to the encryption key, which is referred to as a "decryption key".

For an illegal user to recover the plaintext from the ciphertext by using any means or to illegally find the decryption key is referred to as "cryptanalysis". According to the modern cryptographic techniques, the security of cryptography relies on an encryption key or a decryption key. Thus, even if a user knows the encryption algorithm, the user is unable to obtain the plaintext unless the user has the key. As a result, even the programmer who has produced the encryption algorithm cannot succeed in the cryptanalysis.

Many types of encryption algorithms are currently available, and they are broadly classified into two systems, such as asymmetric cryptosystems (public key cryptosystems) and symmetric cryptosystems (conventional cryptosystems), according to whether the encryption key may be publicly obtained.

In an asymmetric cryptosystem, i.e., a public key cryptosystem, an encryption key and a decryption key are different, and the decryption key cannot easily be calculated from the encryption key. The encryption key and the decryption key in this system are referred to as the "public key" and the "private key", respectively.

The asymmetric cryptosystem has the following features.

(1) The encryption key and the decryption key are different. It is not necessary to secretly deliver the encryption key, which can be available to the public, and it is easy to deliver the key.

(2) Since the user's encryption key is available to the public, the user needs to store only the user's own decryption key secretly.

(3) An authentication function can be provided to verify that identity of the sender of the transmitted message and that the message has not been tampered. As an asymmetric cryptosystem that can achieve both the encryption function and the authentication function, the RSA cipher system (R. L. Rivest, A. Schamir and L. Adleman, "A method of obtaining digital signatures and public key cryptosystems", Comm of ACM,) is known. As one of the above type of asymmetric cryptosystems, the ElGamal cryptosystem (T. E. ElGamal, "A public key cryptosystem and a signature scheme based on discrete logarithms," IEEE Transaction on Information Theory, Vol. IT-31, No. 4, pp. 469–472, 1985) is well known.

As an asymmetric cryptosystem that can achieve only the authentication function, the Fiat-Shamir scheme (A. Fiat, A. Shamir, "How to prove yourself: practical solutions of identification and signature problems," Proc. of CRYPTO' 86, 1987) and the Schnorr scheme (C. P. Schnorr, "Emcient signature generation by smart cards," Journal of Cryptology vol. 4, pp. 161–174, 1991) are well known.

In a symmetric cryptosystem, on the other hand, which is also referred to as the "common key cryptosystem", the encryption key and the decryption key are the same. Since the advent of the public key cryptosystem in the latter half of 1970', the symmetric cryptosystem has also been referred to as the "conventional cryptosystem". The symmetric cryptosystems are classified into two types, i.e., block ciphers and stream ciphers. In the former, each character string (block) of a predetermined length is encrypted by the same key, and in the latter, the individual character strings or the individual bits are encrypted by using different keys.

Block ciphers include transposition ciphers for encrypting a block by transposing the order of the character string, and substitution ciphers for encrypting a block by substituting a character with another character. For example, Data Encryption Standard (DES) and Fast data Encipherment ALgorithm (FEAL) are commercially available.

In stream ciphers, an exclusive-or (XOR) is performed on a message by using a random number, thereby disordering the content of the message. As this type of cipher, the Vernam cipher is well known in which a random number sequence is used as a one-time disposable key.

2. First Embodiment

FIG. 1 is a block diagram illustrating the configuration of an image input apparatus according to a first embodiment of the present invention. In FIG. 1, an image input apparatus 100 is formed of a tamper resistant module 10, a mechanical driving unit 6, an operation unit 8, and an external interface 7. An integrated circuit (IC) card 20 is attachable to and detachable from the image input apparatus 100. The IC card 20 is also attachable to and detachable from an image processing apparatus 200, which is separately disposed from the image input apparatus 100. The image processing apparatus 200 is, for example, a computer. By connecting the IC card 20 to the information processing apparatus 200, the image information encrypted by an encryption key of the IC card 20 can be decrypted.

The tamper resistant module 10 integrates an image pick-up unit 1, a central information processing unit (hereinafter referred to as a "CPU") 2, a control program memory 3, a work memory 4, and an encryption unit 5.

In the tamper resistant module 10, upon detecting that the data processed by the encryption unit 5 is being physically removed, the CPU 2 is adapted to erase and destroy the program and data stored in the control program memory 3 and in the work memory 4.

In the image input apparatus 100 of this embodiment, the image pick-up unit 1 picks up an image of a subject to generate an analog image signal and further converts it to a digital image signal. The image pick-up unit 1 controls, based on the program stored in the control program memory 3, the signal processing executed on the digital image signal so that good visual images are obtained.

Subsequently, the CPU 2 performs a predetermined image processing on the digital image information and then performs high-efficiency coding on the image information. The coded image information is then supplied to the encryption unit 5. Thereafter, the encryption unit 5 encrypts the digital image information by using the encryption key input from the IC card 20 through the external interface 7 and outputs the encrypted image information. The encrypted image information is then stored in a storage medium (not shown). The external interface 7 is used for receiving an encryption key from an external unit and for outputting encrypted information from the apparatus.

The tamper resistant module 10 is constructed in such a manner that the data and the content of communications stored within the image pick-up unit 1, the CPU 2, the control program memory 3, the work memory 4, and the encryption unit 5 are prevented from being output to an external source until the encryption processing is completed.

The cryptosystem and the method for setting the encryption key used for performing encryption in the first embodiment are described below. As noted above, there are two types of cryptosystems, such as the public key cryptosystem and the common key cryptosystem. In using the common key cryptosystem, it is necessary to specify that the encryption key (hereinafter referred to as the "common key") without being known to unauthorized users. If, on the other hand, the public key cryptosystem is used, it is not necessary to specify that the encryption key (hereinafter referred to as the "public key") without being known to unauthorized users since it can be available to the public.

There are the following three methods for setting the encryption key. In the first method, the encryption key is stored in the control program memory 3 in advance when the image input apparatus 100 is manufactured. In the second method, the encryption key is input from the operation unit 8, and in the third method, the encryption key is input from the IC card 20 through the external interface 7.

In the first method, the different encryption keys may be stored in the individual apparatuses, or the same encryption key may be stored in all the apparatuses of a certain type. Whichever approach is employed, the decryption key corresponding to the encryption key should be known only to the authorized users for the apparatus. Accordingly, special attention is required. Moreover, it is difficult to assign the different encryption keys to a plurality of users, so that, in practice, it is necessary to share the same encryption key and decryption key for all the users.

In the second method, since the user of the apparatus can directly input the encryption key which is known only to the user, there is a small probability that the encryption key will be revealed to unauthorized users. Thus, the security can be enhanced over the first method. However, in such a complicated encryption processing having a high level of security, it is not always easy for humans to set the encryption key. Thus, if the size or the content of the encryption key is too large or too difficult to store and input, the input operation becomes troublesome and a nuisance for the user.

In the third method, a suitable external apparatus, for example, the IC card 20, is connected to the external interface 7, and the encryption key is input into the image input apparatus 100 from the external apparatus. In this method, if communications for inputting the encryption key are automatically performed between the external apparatus and the image input apparatus 100 as required, the drawbacks of the first method can be overcome, and also, the time and effort required by users are lessened.

Figure 2:
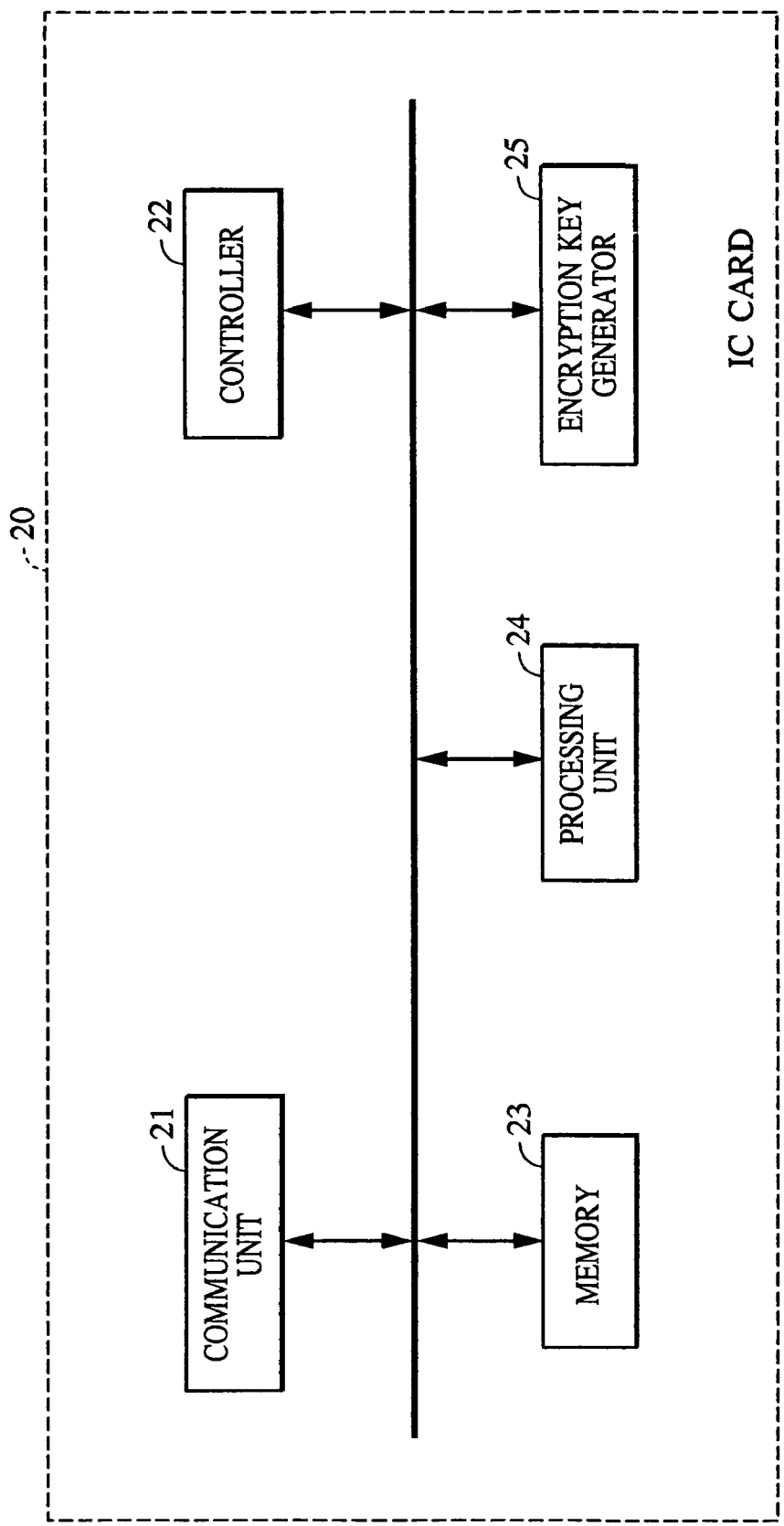
FIG. 2 is a block diagram illustrating the configuration of an IC card.

In the following description of the first embodiment, it is now assumed that the IC card 20 shown in FIG. 2 is used as the external apparatus to be connected to the external interface 7. The user of the image input apparatus 100 carries the IC card 20 in which a memory 23 having a certain storage capacity and a processing unit 24 having a calculation capacity are stored. It is now assumed that the encryption key and the corresponding decryption key which are known only to the user are stored in the IC card 20.

The IC card 20 is manufactured in such a manner that it is very difficult to obtain the encryption key even if the IC card 20 is disassembled. The user connects the IC card 20 to the external interface 7 when using the image input apparatus 100. The image input apparatus 100 then encrypts the picked-up image with the encryption key input from the IC card 20 and outputs the encrypted image information. The encryption key input into the image input apparatus 100 is always erased after the image information has been encrypted.

Namely, by using the IC card 20, the encrypted image information can be decrypted only by the user who has the decryption key corresponding to the encryption key stored in the IC card 20. Accordingly, the user simply connects the IC card 20 to the external interface 7 before performing a photographic operation, and the picked-up encrypted image information can be obtained merely by performing a photographic operation. In the third method, therefore, the burden in inputting the encryption key can be significantly reduced compared to the second method.

As discussed above, by using the IC card 20, the image information can be encrypted by employing either of the public key cryptosystem or the common key cryptosystem. The image processing apparatus 200 is able to decrypt the encrypted image information with the decryption key stored in the IC card 20, thereby obtaining the high-efficiency coded image information.

The third method is discussed in detail below when the common key cryptosystem, for example, is used alone. The IC card 20 is used as the external apparatus, as illustrated in FIG. 1. The IC card 20 shown in FIG. 2 includes an encryption key generator 25 for generating a common key and a communication unit 21 for inputting the common key into the image input apparatus 100.

The common key is produced by means such as generating a random number. The user connects the IC card 20 to the image input apparatus 100 via the external interface 7 and performs a photographic operation. The IC card 20 connected to the external interface 7 supplies the common key to the image input apparatus 100 via the communication unit 21.

The image input apparatus 100 encrypts the picked-up image with the common key by using the encryption unit 5, and then outputs the encrypted image information. The common key is erased from all the memory devices provided for the image input apparatus 100 after the encryption operation has been completed. Thereafter, the user connects the IC card 20 to the information processing apparatus 200, which is then able to decrypt the encrypted image information output from the image input apparatus 100 by using the common key read from the IC card 20.

As the above-described image input apparatus 100, a scanner, a digital still camera, or a digital video camera may be considered. A copying machine or a facsimile machine, both of which are provided with an image pick-up unit, may also be used.

Figure 3:
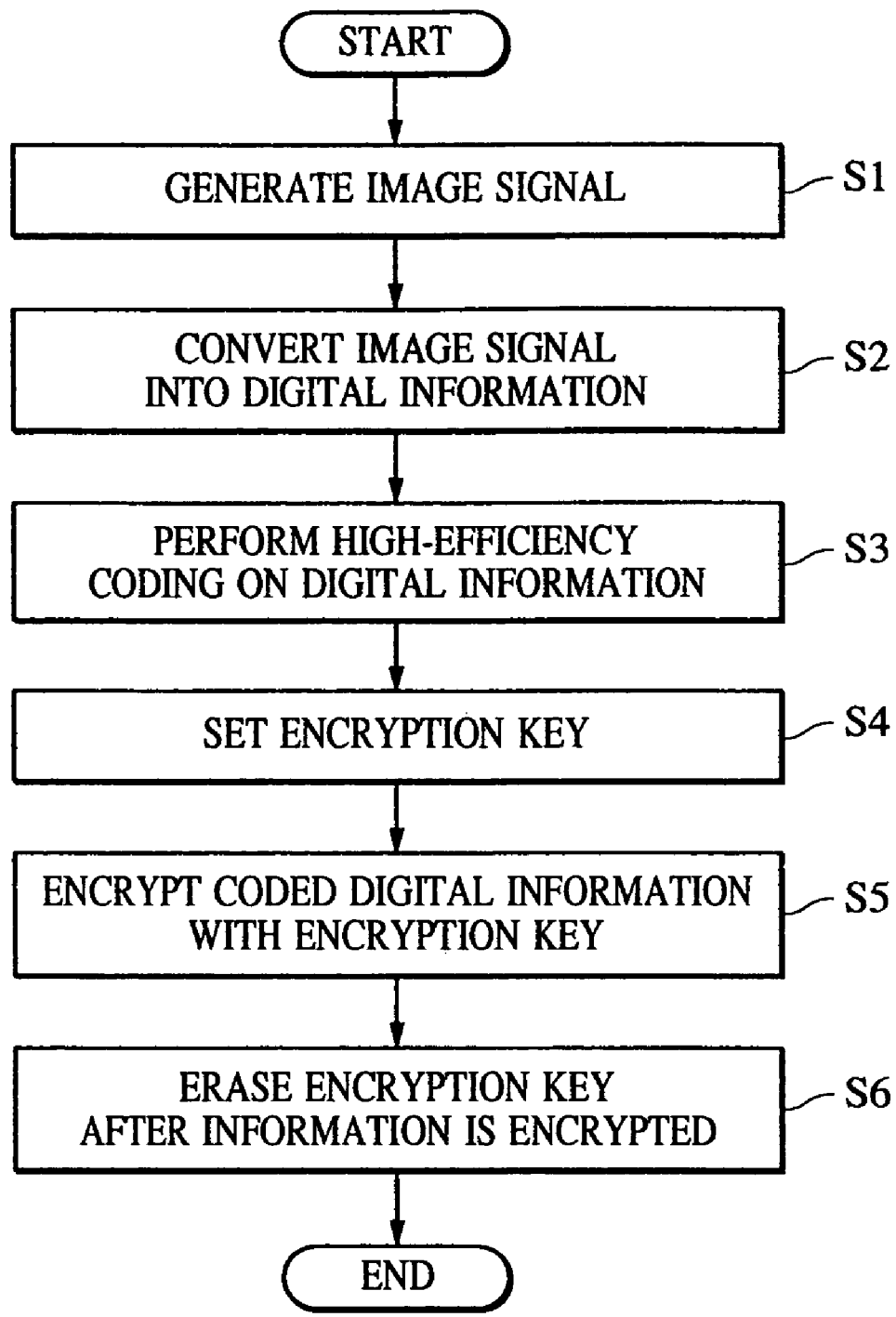
FIG. 3 is a flow chart illustrating encryption processing according to the first embodiment of the present invention.

FIG. 3 is a flow chart illustrating the encryption processing performed by the image input apparatus 100. In step S1, the image pick-up unit 1 of the image input apparatus 100 of the first embodiment optically picks up an image of a subject and generates an image signal.

In step S2, the image pick-up unit 1 then converts the image signal into digital information. Subsequently, in step S3, the CPU 2 performs high-efficiency coding on the digital information.

In step S4, the encryption key (the public key or the common key) for encrypting the coded digital information is read from the IC card 20 and is then set. Thereafter, in step S5, the encryption unit 5 encrypts the coded digital information with the encryption key set by the CPU 2. In step S6, the CPU 2 then erases the encryption key from all the memory devices, including the control program memory 3 and the work memory 4, from the image input apparatus 100 after the digital information has been encrypted.

According to the foregoing description, in the image input apparatus 100 constructed in accordance with the first embodiment of the present invention, the encryption key (the common key or the public key) required for the encryption operation is input from the external apparatus, i.e., the IC card 20, and is reliably erased after the encryption operation has been completed. This makes it possible to protect the encryption key from being obtained by illegal users and also to enhance the user's convenience. The decryption key for decrypting the encrypted information is stored in the IC card 20 rather than being input into the image input apparatus 100, thereby also protecting the decryption key from being obtained by illegal users from the image input apparatus 100.

In the image input apparatus 100, upon detecting that any physical operation is being performed on the tamper resistant module 10, the program and the data required for encrypting information are removed and destroyed. It is thus possible to enhance the privacy and the security of the image information and also to protect the copyright of the image information more reliably.

In the image input apparatus 100, after the digitized image information has undergone high-efficiency coding, the coded image information is encrypted before being output to an external source. Accordingly, the image information output to the image processing apparatus 200 from the image input apparatus 100 is positively encrypted. Therefore, the copyright of the digital image information can be protected more reliably, thereby preventing illegal copying, use, viewing, sale, etc., of the image information.

Additionally, in the image input apparatus 100, since the encryption key for encrypting the digital image information is input into the image input apparatus 100 from an external source, different encryption keys can be assigned to a plurality of users without increasing the complexity of the configuration of the image input apparatus 100. As a consequence, even if the single image input apparatus 100 is shared among a plurality of users, the privacy and the security of the image information between the users can be maintained, thereby more reliably protecting the copyrights of the image information picked up by the individual users.

3. Second Embodiment

In the first embodiment, the image input apparatus 100 that encrypts digital information by using the public key cryptosystem or the common key cryptosystem has been discussed.

In the second embodiment, an image input apparatus 400 that encrypts digital information by using a combination of the public key cryptosystem and the common key cryptosystem is described below.

In the second embodiment, as well as in the first embodiment, an IC card 20 is used as an attachable and detachable external apparatus for supplying an encryption key. The IC card 20 has, as illustrated in FIG. 2, the encryption key generator 25 for generating an encryption key, i.e., a public key, used in the public key cryptosystem. The IC card 20 also has a communication unit 21 for supplying the public key to the image input apparatus 400. The image input apparatus 400 of the second embodiment includes an encryption key generator 409 for generating a common key by using a random number and an encryption unit 409 for performing encryption operations by using the public key or the common key.

The configuration of the image input apparatus 400 of the second embodiment is described below with reference to FIG. 4.

Figure 4:
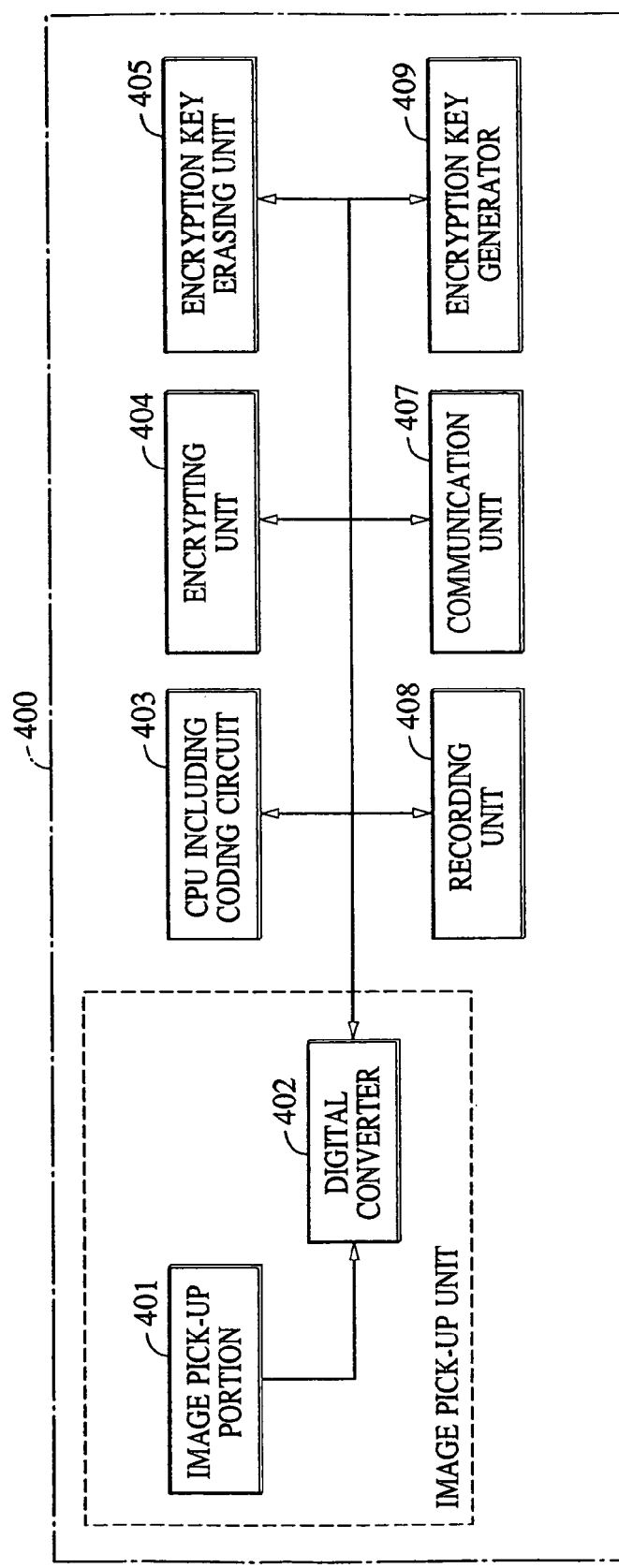
FIG. 4 is a block diagram illustrating the configuration of an image input apparatus according to a second embodiment of the present invention.

The image input apparatus 400 is formed, as shown in FIG. 4, of an image pick-up portion 401, a digital converter 402, a CPU 403 including a high-efficiency coding circuit, an encryption unit 404, an encryption key erasing unit 405, a communication unit 407, a recording unit 408, and an encryption key generator 409.

The image pick-up portion 401 picks up an image of a subject and generates an image signal. The digital converter 402 converts the image signal into digital information. The CPU 403 performs high-efficiency coding on the digital information and also controls the operations of the individual elements of the image input apparatus 400. The encryption unit 404 includes an encryption circuit for encrypting the coded digital information according to the common key cryptosystem. The encryption unit 404 also contains an encryption circuit for encrypting the common key according to the public key cryptosystem.

The encryption key generator 409 generates a common key required for the encryption operation of the encryption unit 404. The encryption key erasing unit 405 erases all the encryption keys (the public key and the common key) after the encryption unit 404 has encrypted the digital information.

The communication unit 407 outputs the encrypted digital information and the encrypted common key to an external source. The recording unit 408 records the encrypted digital information on a recording medium.

The information processing apparatus 200 of the second embodiment is connectable to the above-described IC card 20. By connecting the IC card 20 to the information processing apparatus 200, the information processing apparatus 200 decrypts the encrypted common key by using the decryption key read from the IC card 20, and then decrypts the encrypted image information with the common key decrypted.

A description is given hereinbelow of the encryption processing performed by the image input apparatus 400 constructed as described above.

The user performs a photographic operation by connecting the IC card 20 to the image input apparatus 400. In this case, the IC card 20 supplies the public key to the image input apparatus 400.

Figure 5:
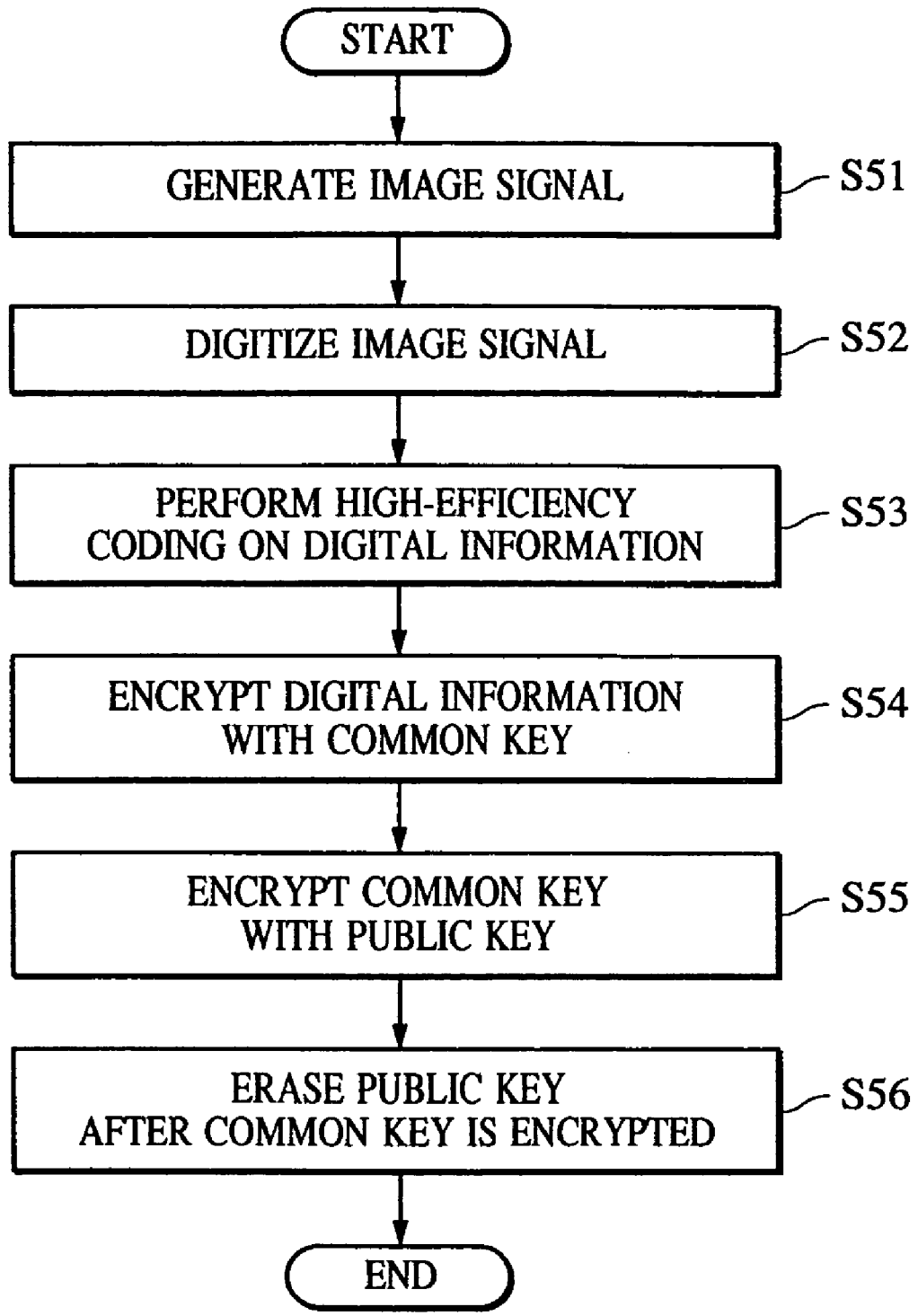
FIG. 5 is a flow chart illustrating encryption processing according to the second embodiment of the present invention.

Referring to FIG. 5, in step S51, in response to the user's operation, the image pick-up portion 401 of the image input apparatus 400 optically picks up an image of a subject and generates an image signal. In step S52, the digital converter 402 then converts the image signal into digital information. Subsequently, in step S53, the CPU 403 performs high-efficiency coding on the digital information by using the high-efficiency coding circuit.

In step S54, the encryption key generator 409 of the image input apparatus 400 generates a common key by using a random-number generating circuit, and the encryption unit 404 encrypts the coded digital information with the generated common key. Simultaneously, in step S55, the common key is further encrypted in the encryption unit 404 by using the public key input from the external IC card 20. Thereafter, in step S56, the common key and the public key are erased from all the memory devices of the image input apparatus 400 after the digital information has been encrypted.

As discussed above, according to the image input apparatus 400 constructed in accordance with the second embodiment of the present invention, it is performed by a combination of the public key input from an external apparatus, i.e., the IC card 20, and the common key generated by the image input apparatus 400. Thus, the privacy and the security of the image information can be enhanced to a higher level, and any copyright of the image information can be protected more reliably.

In the image input apparatus 400, after the digital image information is encrypted and the encryption key is encrypted by another encryption key, each encryption key according to the respective cryptosystems is completely erased, thereby preventing each encryption key from being obtained by illegal users. The decryption key for decrypting the encrypted digital information is retained in the external IC card 20 rather than residing in the image input apparatus 400, thereby also protecting the decryption key from being obtained from the image input apparatus 400 by illegal users.

In the image input apparatus 400, after the digitized image information has undergone high-efficiency coding, the coded image information is encrypted before being output to an external source. Accordingly, the image information output to the image processing apparatus 200 from the image input apparatus 400 is positively encrypted. Therefore, the copyright of the digital image information can be protected more reliably, and illegal copying, use, viewing, sale, etc., of the image information can be prevented.

Additionally, in the image input apparatus 400, since the encryption key for encrypting the digital image information is encrypted by another encryption key stored in the IC card 20, different encryption keys can be assigned to a plurality of users without increasing the complexity of the configuration of the image input apparatus 400. As a consequence, even if the single image input apparatus 400 is shared among a plurality of users, the privacy and the security of the image information among the users can be maintained, thereby more reliably protecting the copyrights of the image information picked up by individual users.

The invention may be embodied in other specific forms without departing from the spirit or essential characteristics thereof.

For example, the image input apparatus 100 may be configured in the following manner to achieve the functions of the first embodiment. A software program code that implements the encryption function described in the first embodiment may be stored in the control program memory 3 shown in FIG. 1, and the CPU 2 shown in FIG. 1 may control the operation of the individual processing units of the image input apparatus 100 in accordance with the program code.

Similarly, the image input apparatus 400 may be configured in the following manner to attain the functions of the second embodiment. A software program code that implements the encryption functions discussed in the second embodiment may be stored in the recording unit 408 shown in FIG. 4, and the CPU 403 shown in FIG. 4 may control the operations of the individual processing units of the image input apparatus 400.

As a storage medium for storing the above-described program code, a floppy disk, a compact disc-read only memory (CD-ROM), a magnetic tape, a hard disk, an optical disc, a magneto-optical disk, or a non-volatile memory card may be used.

Therefore, the above-mentioned embodiments are merely examples in all respects and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. An image input apparatus comprising:
   connecting means for locally connecting a key storage device to the image input apparatus;
   generating means for generating a digital image in the image input apparatus;
   reading means for reading an encryption key stored in the key storage device connected to the connecting means;
   storage means for storing, in the image input apparatus, said read encryption key to execute an encryption process;
   encryption means for encrypting the generated digital image with said encryption key stored in the storage means;
   output means for outputting the encrypted digital image to a memory in the image input apparatus;
   erasing means for erasing said stored encryption key in said storage means after encrypting the digital image by said encryption means;
   obtaining means for obtaining, from said key storage device, a decryption key corresponding to said encryption key; and
   decryption means for decrypting the stored encrypted digital image by using said decryption key obtained by said obtaining means.

2. An image input apparatus according to claim 1, wherein said encryption means encrypts the digital image which has undergone a high-efficiency coding operation.

3. An image input apparatus according to claim 1, further comprising image pick-up means for optically picking up an image of a subject and for generating an image signal from the picked-up image.

4. An image input apparatus according to claim 1, wherein said encryption key comprises an encryption key based on a common key cryptosystem.

5. An image input apparatus according to claim 1, wherein said encryption key comprises an encryption key based on a public key cryptosystem.

6. An image input apparatus according to claim 1, wherein the key storage device comprises an integrated circuit card removably connectable to the image input apparatus and the encryption and decryption keys are stored in the integrated circuit card.

7. An image input method for an image input apparatus, comprising the steps of:
   locally connecting a key storage device to the image input apparatus;
   generating a digital image in the image input apparatus;
   reading an encryption key stored in the key storage device connected to the image input apparatus;
   storing, in a storage means of the image input apparatus, said read encryption key to execute an encryption process;
   encrypting the generated digital image with said encryption key stored in the storage means;
   outputting the encrypted digital image to a memory in the image input apparatus;
   erasing said stored encryption key after encrypting the digital image by the encrypting step;
   obtaining, from said key storage device, a decryption key corresponding to said encryption key; and
   decrypting the stored encrypted digital image by using said decryption key obtained in the obtaining step.

8. An image input method according to claim 7, wherein the digital image which has undergone a high-efficiency coding operation is encrypted.

9. An image input method according to claim 7, wherein an image signal is generated from an optically picked up image of a subject which is converted into the digital information image.

10. An image input method according to claim 7, wherein said encryption key comprises an encryption key based on one of a common key cryptosystem and a public key cryptosystem.

11. An image input method according to claim 7, wherein the key storage device comprises a removably connectable integrated circuit card and the encryption and decryption keys are stored in the integrated circuit card.

12. An encryption processing program stored in a computer-readable medium, the program to be executed by an image input apparatus, comprising:
   a step of locally connecting a key storage device to the image input apparatus;
   a step of generating a digital image in the image input apparatus;

a step of reading an encryption key stored in the key storage device connected to the image input apparatus;
a step of storing, in a storage means of the image input apparatus, said read encryption key to execute an encryption process;
a step of encrypting the generated digital image with said encryption key stored in the storage means;
a step of outputting the encrypted digital image to a memory in the image input apparatus;
a step of erasing the stored encryption key after the step of encrypting the digital image;
a step of obtaining, from said key storage device, a decryption key corresponding to said encryption key; and
a step of decrypting said encrypted digital image by using said decryption key obtained in the obtaining step.

13. An encryption processing program according to claim 12, wherein the key storage device comprises a removably connectable integrated circuit card and the encryption and decryption keys are stored in the integrated circuit card.

14. An image input apparatus comprising:
connecting means for locally connecting a key storage device to the image input apparatus;
image generating means for generating a digital image in the image input apparatus;
key generating means for generating an internal key;
image encryption means for encrypting the generated digital image with said internal key;
reading means for reading an encryption key stored in the key storage device connected to the image input apparatus;
storage means for storing, in the image input apparatus, said read encryption key to execute a key encryption process;
key encryption means for encrypting said internal key with said read encryption key stored in said storage means;
output means for outputting the encrypted digital image and the encrypted internal key to a memory in the image input apparatus;
erasing means for erasing said read encryption key stored in the storage means and said internal key after executing said encryption process by said image encryption means and said key encryption means;
obtaining means for obtaining, from said key storage device, a decryption key corresponding to said read encryption key stored in said key storage device;
key decryption means for decrypting said encrypted internal key with said obtained decryption key; and
decryption means for decrypting said encrypted digital image with said internal key decrypted by said key decryption means.

15. An image input apparatus according to claim 14, wherein said internal encryption key comprises an encryption key based on a common key cryptosystem, and said read encryption key comprises an encryption key based on a public key cryptosystem.

16. An image input apparatus according to claim 14, wherein the key storage device comprises an integrated circuit card removably connnectable to the image input apparatus and the encryption and decryption keys are stored in the integrated circuit card.

17. An image input method for an image input apparatus comprising the steps of:
locally connecting a key storage device to the image input apparatus;
generating a digital image in the image input apparatus;
generating an internal key;
encrypting the generated digital image with said generated internal key;
reading an encryption key stored in the key storage device connected in the connecting step;
storing said read encryption key in a storage means in the image input apparatus to execute a key encryption process;
key encrypting said internal key with said read encryption key stored in said storage means;
outputting the encrypted digital image and the encrypted internal key to a memory in the image input apparatus;
erasing the read encryption key stored in the storage means and said internal key after executing said encrypting step by said image encrypting step and the key encrypting step;
obtaining, from said key storage device, a decryption key corresponding to said read encryption key;
key decrypting said encrypted internal key with said obtained decryption key; and
decrypting said encrypted digital image with said internal key decrypted by the key decrypting step.

18. An image input method according to claim 17, wherein the key storage device comprises a removably connnectable integrated circuit card and the encryption and decryption keys are stored in the integrated circuit card.

19. An encryption processing program stored in a computer-readable medium, the program to be executed by an image input apparatus, comprising the steps of:
a step of locally connecting a key storage device to the image input apparatus;
a step of generating a digital image in the image input apparatus;
a step of generating an internal key;
a step of encrypting the generated digital image with said internal key;
a step of reading an encryption key stored in the key storage device connected in the connecting step;
a step of storing said read encryption key in a storage means in the image input apparatus to execute a key encryption process;
a step of key encrypting said internal key with said read encryption key stored in said storage means;
a step of outputting the encrypted digital image and the encrypted internal key to a memory in the image input apparatus;
a step of erasing the read encryption key stored in the storage means and the internal key after executing the encrypting step by the digital image encrypting step and the key encrypting step;
a step of obtaining, from the key storage device, a decryption key corresponding to the read encryption key;
a step of key decrypting said encrypted internal key with said obtained external decryption key; and
a step of decrypting said encrypted digital image with said internal key decrypted by the key decrypting step.

20. An encryption processing program according to claim 19, wherein the key storage device comprises a removably connnectable integrated circuit card and the encryption and decryption keys are stored in the integrated circuit card.

* * * * *